(12) United States Patent
Bostick et al.

(10) Patent No.: US 10,332,561 B2
(45) Date of Patent: *Jun. 25, 2019

(54) MULTI-SOURCE VIDEO INPUT

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,660

(22) Filed: Oct. 31, 2017

(65) Prior Publication Data

US 2018/0053532 A1    Feb. 22, 2018

Related U.S. Application Data

(63) Continuation of application No. 14/470,029, filed on Aug. 27, 2014, now Pat. No. 9,870,800.

(51) Int. Cl.
*H04N 9/80*    (2006.01)
*G11B 27/036*    (2006.01)
(Continued)

(52) U.S. Cl.
CPC .......... *G11B 27/036* (2013.01); *H04N 5/265* (2013.01); *H04N 5/77* (2013.01)

(58) Field of Classification Search
None
See application file for complete search history.

(56) References Cited

U.S. PATENT DOCUMENTS 6,970,639 B1    11/2005    McGrath et al.
8,510,375 B2    8/2013    Bouazizi
(Continued)

FOREIGN PATENT DOCUMENTS

EP    1585128    10/2005
EP    2262244    12/2010
(Continued)

OTHER PUBLICATIONS

Final Office Action from U.S. Appl. No. 14/470,041 dated Oct. 19, 2017, 23 pages.
(Continued)

*Primary Examiner* — Hung Q Dang
(74) *Attorney, Agent, or Firm* — Christopher McLane; Andrew M. Calderon; Roberts Mlotkowski Safran Cole & Calderon, P.C.

(57) ABSTRACT

A method of merging video files into a consolidated video file includes receiving, by a computer device, plural video files from plural video capture devices. The method also includes determining, by the computer device, an overlapping portion of the plural video files. The method additionally includes creating, by the computer device, a thumbnail image associated with the determined overlapping portion. The method further includes creating, by the computer device, a single video file from the plural video files. The method also includes displaying, by the computer device, the single video file and a thumbnail image.

20 Claims, 5 Drawing Sheets

(51) Int. Cl.
*H04N 5/265* (2006.01)
*H04N 5/77* (2006.01)

(56) References Cited

U.S. PATENT DOCUMENTS

| | | |
|---|---|---|
| 8,625,032 B2 | 1/2014 | Chitnis et al. |
| 8,917,355 B1 | 12/2014 | Mo et al. |
| 2002/0069218 A1 | 6/2002 | Sull et al. |
| 2003/0002851 A1 | 1/2003 | Hsiao et al. |
| 2004/0143604 A1 | 7/2004 | Glenner et al. |
| 2005/0091597 A1 | 4/2005 | Ackley |
| 2006/0010383 A1 | 1/2006 | Tanaka et al. |
| 2007/0110399 A1 | 5/2007 | Roh |
| 2008/0059510 A1 | 3/2008 | Cardamore et al. |
| 2008/0145034 A1 | 6/2008 | Barton |
| 2009/0309987 A1 | 12/2009 | Kimura et al. |
| 2010/0077289 A1 | 3/2010 | Das et al. |
| 2010/0122208 A1 | 5/2010 | Herr et al. |
| 2010/0281382 A1 | 11/2010 | Meaney et al. |
| 2011/0225156 A1 | 9/2011 | Pavlik |
| 2012/0163770 A1 | 6/2012 | Kaiser |
| 2012/0236201 A1 | 9/2012 | Larsen et al. |
| 2013/0007043 A1 | 1/2013 | Phillips et al. |
| 2013/0007620 A1 | 1/2013 | Barsook et al. |
| 2013/0013583 A1 | 1/2013 | Yu et al. |
| 2013/0188923 A1 | 7/2013 | Hartley et al. |
| 2013/0195422 A1 | 8/2013 | Patil et al. |
| 2013/0223343 A1 | 8/2013 | Wentink et al. |
| 2014/0101551 A1 | 4/2014 | Sherrets et al. |
| 2015/0169542 A1 | 6/2015 | Lin |
| 2015/0293995 A1 | 10/2015 | Chen et al. |
| 2015/0365716 A1 | 12/2015 | Fonseca, Jr. et al. |
| 2016/0063103 A1 | 3/2016 | Bostick et al. |
| 2016/0064035 A1 | 3/2016 | Bostick et al. |
| 2016/0261930 A1* | 9/2016 | Kim ............... H04N 21/845 |

FOREIGN PATENT DOCUMENTS

| | | |
|---|---|---|
| WO | 0160054 | 8/2001 |
| WO | 2012151651 | 11/2012 |

OTHER PUBLICATIONS

Anonymous, "Advanced Video Management Systems", IPCOM00191225D, Dec. 22, 2009; 21 pages.

Baugher et al, "Method to Deliver Scalable Video Across a Distributed Computer System", IPCOM000112441D, Mar. 27, 2005; 7 pages.

Lindsay et al, "RFID Locating Systems for Linking Valued Objects with Multimedia Files", IPCOM000021113D, Dec. 23, 2003; 15 pages.

List of IBM Patents or Patent Applications Treated as Related 1 page.

Notice of Allowance from U.S. Appl. No. 14/470,041 dated Jun. 11, 2018, 16 pages.

* cited by examiner

MULTI-SOURCE VIDEO INPUT

FIELD OF THE INVENTION

The present invention generally relates to video playback, and more particularly, to a method and system for merging video files from multiple sources.

BACKGROUND

Video camera enabled devices are fast becoming ubiquitous with increasing popularity of smartphones, tablet computers, and hand held cameras. It is a common scenario for plural people to be travelling together (or attending an event together) and for each person to use their own video camera enable device to capture one or more videos during the travel (or event). In this scenario, it is typical for the people to collectively view each others' videos at a later time, e.g., at a home or hotel room after the travel (or event). Using current technology, the videos are viewed one at a time in a disjointed and time consuming process.

SUMMARY

In a first aspect of the invention, there is a method of merging video files into a consolidated video file. The method includes receiving, by a computer device, plural video files from plural video capture devices. The method also includes determining, by the computer device, an overlapping portion of the plural video files. The method additionally includes creating, by the computer device, a thumbnail image associated with the determined overlapping portion. The method further includes creating, by the computer device, a single video file from the plural video files. The method also includes displaying, by the computer device, the single video file and a thumbnail image.

In another of the invention, there is a computer program product for merging video files into a consolidated video file. The computer program product includes a computer readable storage medium having program instructions embodied therewith. The program instructions are executable by a computer device to cause the computer device to: receive, by the computer device, plural video files and metadata associated with each of the plural video files from plural video capture devices; arrange, by the computer device, portions of the plural video files in a logical sequence based on the metadata; create, by the computer device, a single video file from the arranged portions of the plural video files; and display, by the computer device, the single video file.

In a further aspect of the invention, there is a computer system for merging video files into a consolidated video file. The system includes a CPU, a computer readable memory and a computer readable storage medium. Additionally, the system includes one or more program instructions. The program instructions are operable to: receive plural video files and metadata associated with each of the plural video files from plural video capture devices; arrange portions of the plural video files in a logical sequence based on the metadata; determine an overlapping portion of the plural video files; create a thumbnail image for the overlapping portion; create a single video file from the arranged portions of the plural video files; concurrently display both the single video file and the thumbnail image; and display the overlapping portion based upon receiving a user-input selection of the displayed thumbnail image. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
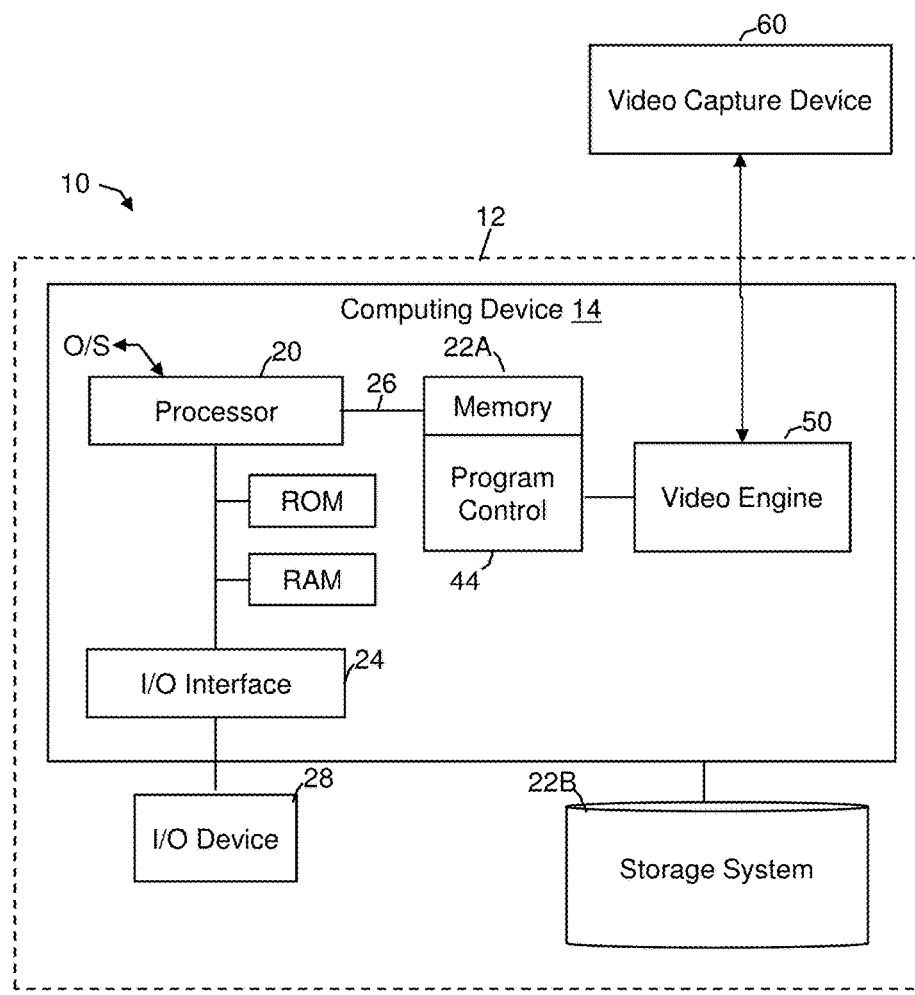
FIG. 1 an illustrative environment for implementing the steps in accordance with aspects of the invention.

The present invention generally relates to video playback, and more particularly, to a method and system for merging video files from multiple sources. In accordance with aspects of the invention, a system receives video files from a plurality of video camera enabled devices, particularly from mobile devices, and merges the video files into one consolidated video file having a logical sequence (e.g., a chronological sequence). In embodiments, the system and method are configured to: receive video files from a plurality of video camera enabled devices, such as mobile devices; identify the metadata for each of the video files, the metadata including the date, time, and/or location of the recording; based on the metadata, arrange the video files in a logical sequence (e.g., chronological sequence); determine whether at least one overlapping scene between the video files exists based on the metadata, particularly the time and date in which the video files were captured, and if so splice the at least one overlapping scene to prevent redundancy; form a thumbnail image corresponding to a video file segment of the spliced overlapping scene; merge the video files into one consolidated video file having a logical sequence; and present the consolidated video file and the thumbnail image to a user, wherein the thumbnail image will be displayed when the video file is playing the segment where the at least one overlapping scene was determined to exist. In this manner, implementations of the invention may be used to consolidate plural video files from plural different sources into a single continuous video file.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26.

The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a video engine 50, e.g., that performs one or more of the processes described herein. The video engine 50 can be implemented as one or more program code in program control 44 stored in memory 22A as separate or combined modules. Additionally, video engine 50 may be implemented as separate dedicated processors or a single or several processors to provide the function of these tools. While executing the computer program code, processor 20 can read and/or write data to/from memory 22A, storage system 22B, and/or I/O interface 24. The program code executes the processes of the invention. The bus 26 provides a communications link between each of the components in computing device 14.

According to aspects of the invention, video engine 50 is configured to communicate with plural video capture devices, referred to collectively with reference number 60 in FIG. 1. In embodiments, video engine 50 is configured to: receive video files from a plurality of video capture devices 60; identify metadata for each of the video files, the metadata including the date, time, and/or location of the recording; based on the metadata, arrange the video files in a logical sequence (e.g., a chronological sequence); determine whether at least one overlapping scene between the video files exists based on the metadata, particularly the time and date in which the video files were captured, and if so splice the at least one overlapping scene to prevent redundancy; form a thumbnail image corresponding to a video file segment of the spliced overlapping scene; merge the video files into one consolidated video file having a logical sequence; and present the consolidated video file and the thumbnail image to a user, wherein the thumbnail image will be displayed when the video file is playing the segment where the at least one overlapping scene was determined to exist.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
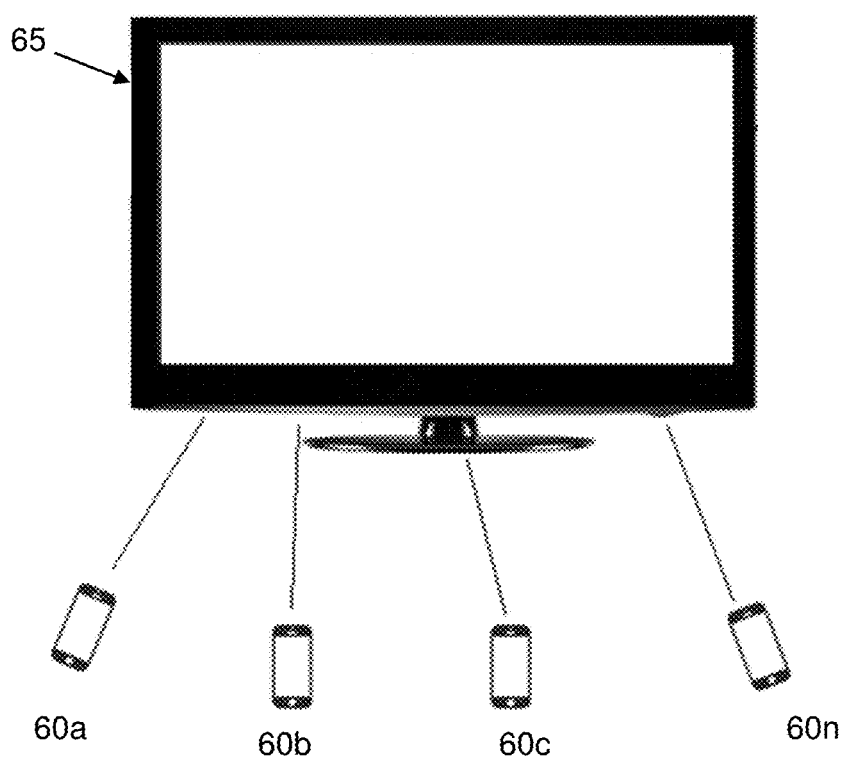
FIG. 2 shows a block diagram of a multi-source video input system in accordance with aspects of the invention.

FIG. 2 shows a block diagram of a multi-source video input system in accordance with aspects of the invention. In embodiments, video display device 65 is configured to communicate with plural video capture devices 60a, 60b, 60c, . . . , 60n. Video display device 65 includes computing device 14 running video engine 50 as described with respect to FIG. 1. The video display device 65 may be embodied, for example, as a personal computer device (e.g., laptop computer, desktop computer, tablet computer, etc.), a television, or a set-top box (e.g., cable television tuner, digital video recorder (DVR), digital media player, etc.). The video capture devices 60a-n may include any suitable devices such as smartphones, tablet computers, laptop computers, hand held video cameras, fixed video cameras (e.g., security cameras), etc., that are capable of capturing and storing video and communicating the video as data to video display device 65. Communication between video display device 65 and each of video capture devices 60a-n may be via wired and/or wireless communication.

Still referring to FIG. 2, video display device 65 is configured to gather videos from each of video capture devices 60a-n. In embodiments, video display device 65 is programmed with logic (e.g., via video engine 50) to select segments of the videos gathered from video capture devices 60a-n and make and display a continuous video sequence from the selected segments. In instances where there is more than one video segment available for a particular time period or section, video display device 65 may be configured to display a thumbnail image associated with each additional segment. The video display device 65 may be further configured to permit a user to select the displayed thumbnail image and play the video segment associated with the selected thumbnail image based on the selection. In this manner, implementations of the invention thus provide a method and system for multi-sourced video input to be displayed in sequence as a single, continuous video.

With continued reference to FIG. 2, in exemplary aspects of the invention, each one of video capture devices 60a-n communicates and registers with video display device 65. The communicating and registering may be performed in any suitable manner, such as using Bluetooth communication, wired communication, or the like. Data regarding video file(s) on each device 60a-n is communicated to video display device 65 in a push or pull manner. For example, in a push implementation, a user may provide input to device 60a to indicate which video file(s) stored on device 60a are to be transmitted to video display device 65. In another example of a pull implementation, video display device 65 may be programmed to pull all video files (defined subset of all video files) from each device 60a-n.

In embodiments, video display device 65 also gathers the date and time from each device 60a-n, which is later used for synchronizing the video segments between devices 60a-n since each device 60a-n time-stamps its respective video files with its particular date and time settings. The video display device 65 also gathers from each device 60a-n metadata associated with each video file. The metadata may include, for example, a date, time, and location of capture of each video file. The location metadata may be based on GPS (global positioning system) data that is associated with a video, e.g., when device 60a-n is a GPS-enabled device such as a smartphone. Alternatively, the location metadata may be programmed into a device, e.g., when device 60a-n is a fixed camera such as a security camera.

In embodiments, video display device 65 normalizes (e.g., synchronizes) the capture date and capture time of each video file based on the combination of: the date and time setting from each device 60a-n, and the capture date and capture time of each video file. For example, device 60a may have a time setting of 4:30 PM and device 60b may have a time setting of 4:33 PM, such that two video files captured at the exact same time on these two devices will have respective capture times that are offset by 3 minutes. In aspects, video display device 65 is programmed to determine and account for this difference between time settings of the devices by adjusting the capture time of one of the video files by the difference in time defined by the time settings of the devices. This normalizing facilitates arranging the video files in a logical sequence relative to a global frame of reference, as described in greater detail herein.

Figure 3:
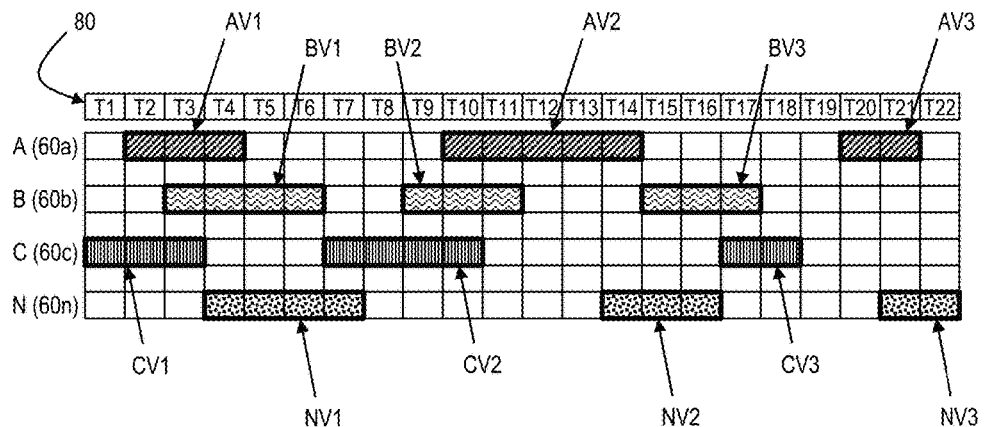
FIGS. 3 and 4 show exemplary video portions in accordance with aspects of the invention.

FIG. 3 shows an exemplary plot of video files in accordance with aspects of the invention. In this example, video files AV1, AV2, AV3 in row A were captured by device 60a and transmitted from device 60a to video display device 65 (as shown in FIG. 2) in the manner already described herein. Similarly, video files BV1, BV2, BV3 in row B were captured by device 60b and transmitted from device 60b to video display device 65. Similarly, video files CV1, CV2, CV3 in row C were captured by device 60c and transmitted from device 60c to video display device 65. Similarly, video files NV1, NV2, NV3 in row N were captured by device 60n and transmitted from device 60n to video display device 65.

FIG. 3 shows the video files AV1, AV2, AV3, BV1, BV2, BV3, CV1, CV2, CV3, NV1, NV2, NV3 arranged against a global frame of reference based on metadata associated with each video file. In this example, the video files are plotted against a global frame of reference after the capture times of the video files have been normalized based on time settings of each device 60a-n as described herein. In the example shown in FIG. 3, the global frame of reference is a timeline 80 that may correspond to, for example, two locations between which the of devices 60a-n traveled while capturing the video files using the devices 60a-n. The global frame of reference is not limited to a timeline as shown in FIG. 3; instead, the global frame of reference may be any parameter or combination of parameters that is used to determine continuity between certain ones of the video files and/or arrange the plural video files in a logical sequence. For example, the global frame of reference may be based on video capture location (e.g., GPS location) of each video file, which may be used to determine location-based continuity between certain ones of the video files. As another example, frame by frame analysis of the video files may be used to determine continuity between certain ones of the video files, e.g., by looking for and identifying a common item (e.g., landmark, person, etc.) in frames of the certain ones of the video files.

As shown in FIG. 3, each device may have gaps in time between its respective video files. For example, there is a gap between video files AV1 and AV2, and another gap between video files AV2 and AV3. This may result, for example, from the user of device 60a intermittently capturing video using device 60a when travelling between the two locations that correspond to the ends of the timeline 80.

Figure 4:
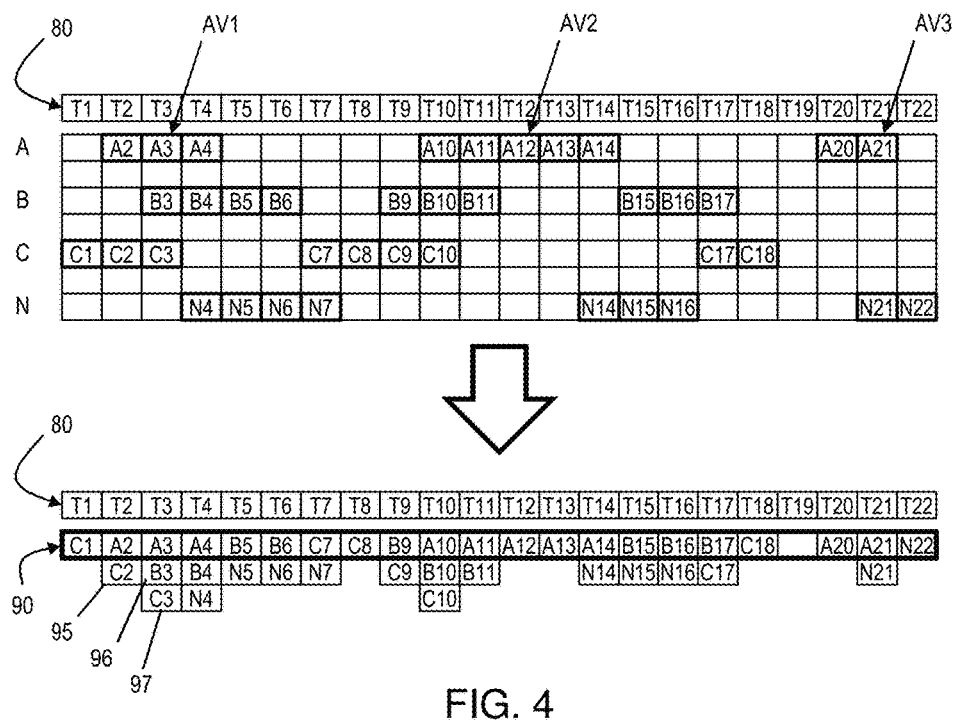

As shown in FIG. 4, video display device 65 is configured to arrange the plural video files in a logical sequence and determine overlapping segments of the plural video files. In embodiments, video display device 65 is configured to discretize each video file into discrete segments that correspond to units defined by the global frame of reference. For example, video file AV1 is divided into segments (e.g., discrete portions) A2, A3, A4 that correspond to time units T2, T3, T4 of timeline 80. Similarly, video file AV2 is divided into segments A10-A14 that correspond to time units T10-T14 of timeline 80. Similarly, video file AV3 is divided into segments A20-A21 that correspond to time units T20-T21 of timeline 80. The respective video files in rows B, C, N may be discretized in a similar manner, as shown in FIG. 4.

Still referring to FIG. 4, video display device 65 is configured to define a single, continuous video 90 by combining (e.g., merging) segments of the plural video files into a logical sequence. The video display device 65 is further configured to determine whether overlapping video segments exits when arranging the video files in the logical sequence. For example, at time T1 there are no overlapping segments, i.e., row C is the only row that includes a video segment (i.e., segment C1) at time T1. Accordingly, video display device 65 populates time T1 of video 90 with video segment C1. At time T2, there are overlapping video segments at row A (i.e., segment A2) and row C (i.e., segment C2). Accordingly, video display device 65 populates time T2 of video 90 with video segment A2 and designates video segment C2 as a secondary segment as indicated at reference number 95. At time T3, there are overlapping video segments at row A (i.e., segment A3), row B (i.e., segment B3), and row C (i.e., segment C3). Accordingly, video display device 65 populates time T3 of video 90 with video segment A3, designates video segment B3 as a secondary segment as indicated at reference number 96, and designates video segment C3 as a tertiary segment as indicated at reference number 97. As shown in FIG. 4, times T4-T22 of video file 90 are populated in a similar manner using discretized video segments.

In embodiments, video display device 65 defines the video 90 by combining the segments of the plural video files based on a hierarchy or ranking of the devices 60a-n. In the example described with respect to FIGS. 3 and 4, device 60a is ranked first, device 60b is ranked second, device 60c is ranked third, and device 60n is ranked fourth. When there are plural video segments at a single time slot, the video segment associated with the highest ranked device is populated in the video 90, and the other video segments are designated as secondary, tertiary, etc., according to the respective rankings of the associated devices. The rankings of devices 60a-n may be assigned by the users via an interface provided on video display device 65. Alternatively, the rankings of devices 60a-n may be automatically assigned by video display device 65 based on factors including but not limited to: order in which devices 60a-n registered with video display device 65; total combined time of video files of each respective device 60*a-n* (e.g., device 60*a* has more combined time of video files than device 60*b*, so that device 60*a* is ranked higher than device 60*b*); quality of the video files of each device 60*a-n* (e.g., range of light to dark, contrast, color, etc.). The segments may be merged together into the single video file 90 using digital video editing tools and/or processes.

Figure 5A:
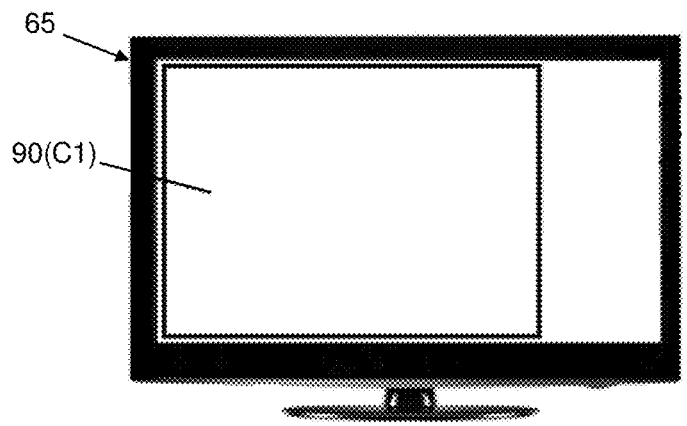
FIGS. 5a, 5b, and 5c show an exemplary display in accordance with aspects of the invention.
Figure 5B:
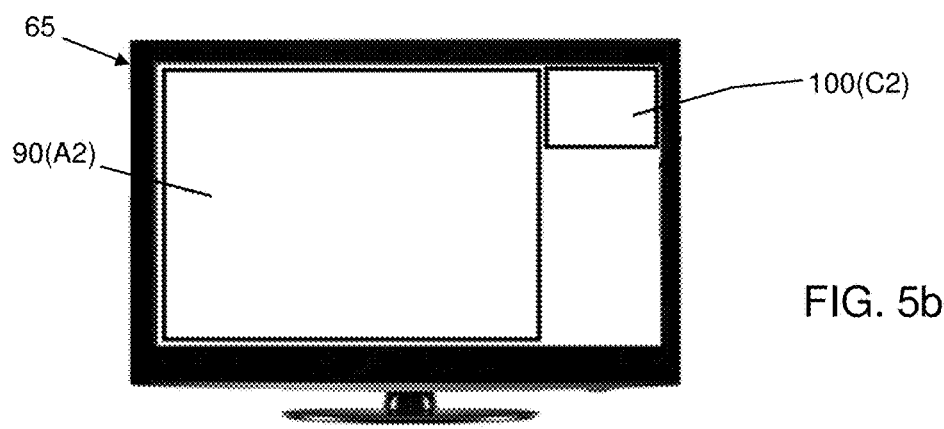
Figure 5C:
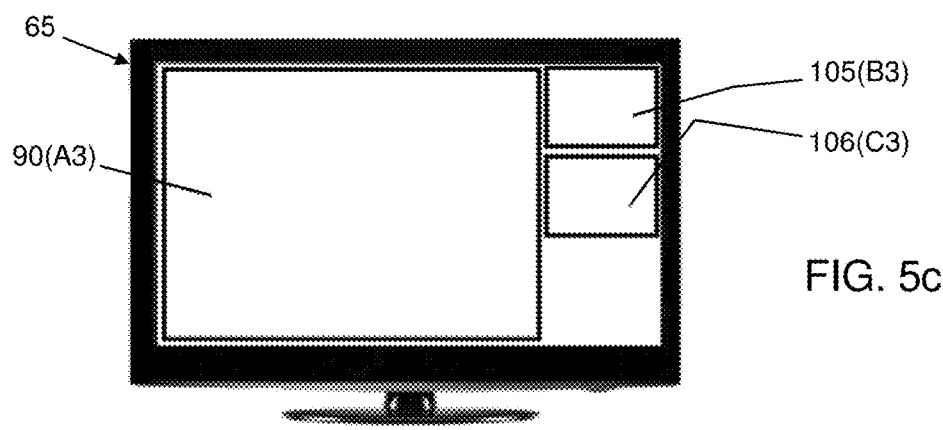

FIGS. 5*a*, 5*b*, and 5*c* depict displaying the single video file and thumbnail images of secondary and tertiary video segments in accordance with aspects of the invention. As used herein, displaying the video file includes playing the contents of the video file on a visual display device. Specifically, FIG. 5*a* shows video display device 65 displaying video segment C1 of video 90 at time T1. FIG. 5*b* shows video display device 65 displaying video segment A2 of video 90 at time T2, as well as thumbnail 100 associated with video segment C2. FIG. 5*c* shows video display device 65 displaying video segment A3 of video 90 at time T3, as well as thumbnail 105 associated with video segment B3 and thumbnail 106 associated with video segment C3. In embodiments, video display device 65 is configured such that a user may select one of the thumbnails to display the video segment associated with the selected thumbnail. For example, in FIG. 5*c*, a user may select thumbnail 106 to cause video display device 65 to display video segment C3. The selection of a thumbnail may be performed in any suitable way, e.g., using a cursor, remote control, voice command, etc. In embodiments, each thumbnail is a still frame of its associated video segment.

In embodiments, video display device 65 is configured to display the video segments (e.g., C1, A2, A3, . . . ) of the video 90 in a continuous manner, without requiring additional input from a user. For example, video display device 65 automatically begins displaying video segment A2 after displaying video segment C1, automatically begins displaying video segment A3 after displaying video segment A2, and so on. As another example, when a user selects a thumbnail for displaying a secondary or tertiary video segment, video display device 65 automatically begins displaying the next primary video segment after displaying the secondary or tertiary video segment. At times where there is no video segment, video display device 65 may be configured to automatically begin displaying the next available video segment to maintain continuous play of the video. For example, in the video 90 of FIG. 4, there is no video segment at time T19; accordingly, video display device 65 automatically begins displaying video segment A20 immediately after the conclusion of video segment C18.

Flow Diagram

Figure 6:
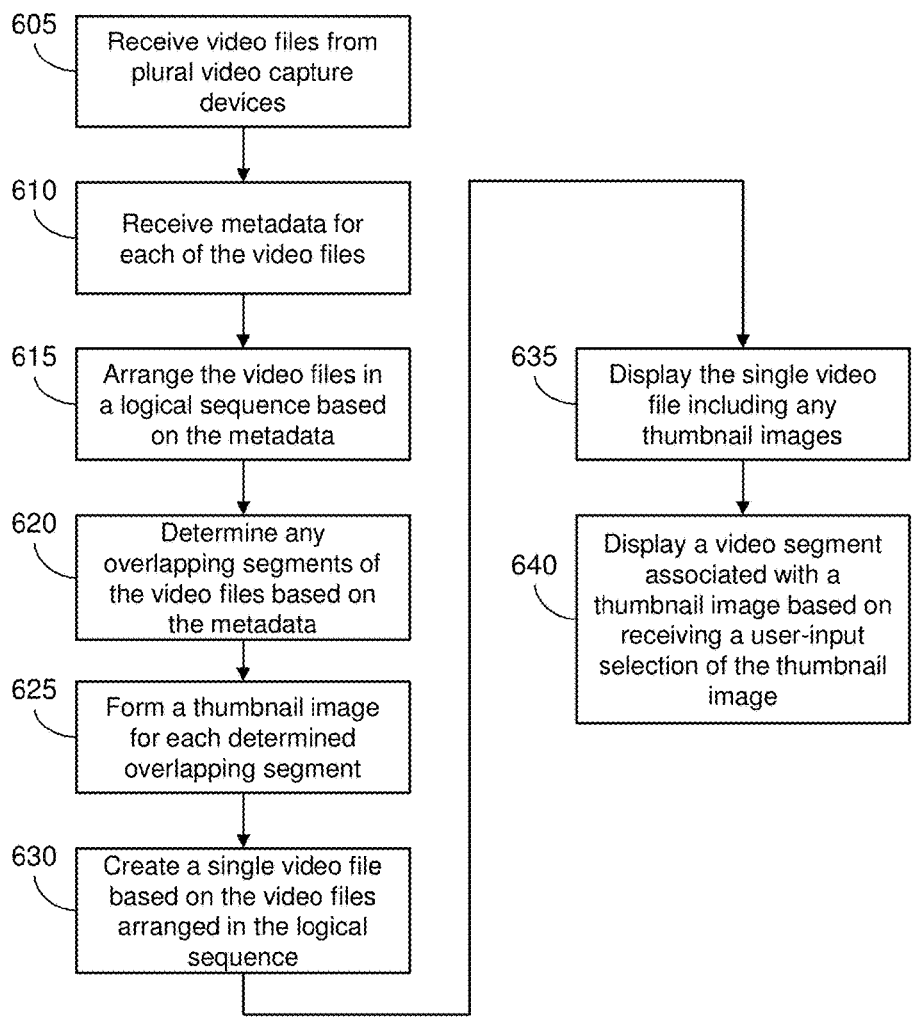
FIG. 6 shows an exemplary flow in accordance with aspects of the invention.

FIG. 6 shows an exemplary flow for performing aspects of the present invention. The steps of FIG. 6 may be implemented in the environment of FIG. 1 and/or FIG. 2, for example. As noted above, the flowchart(s) illustrate the architecture, functionality, and operation of possible implementations of systems, methods, and computer program products according to various embodiments of the present invention.

FIG. 6 depicts an exemplary flow for a process in accordance with aspects of the present invention. At step 605, a video display device (e.g., video display device 65 comprising computing device 14 running video engine 50) receives video files from plural video capture devices (e.g., devices 60*a-n*). Step 605 may be performed in the manner described with respect to FIG. 2. For example, step 605 may include each video capture device registering with the display device. Step 605 may include each video capture device transmitting video files stored on the video capture device to the video display device.

At step 610, the video display device receives metadata for each of the video files that were received at step 605. Step 610 may performed in the manner described with respect to FIG. 2. For example, step 610 may include each video capture device transmitting metadata associated with each of its video files to the video display device. The metadata for a particular video file may be transmitted with the video file, or may be transmitted separately from the video file. The metadata may include, but is not limited to: capture date of the video file; capture time of the video file; capture location (e.g., GPS location) of the video file; identifying information of the video capture device (e.g., device manufacturer, shutter speed, f-stop, etc.). Step 610 may also include the video display device receiving a date and time setting from each video capture device, which may be used to normalize (e.g., adjust) the capture time of video files associated with a particular video capture device relative to other video capture devices, e.g., as described with respect to FIGS. 2 and 3.

At step 615, the video display device arranges the video files in a logical sequence based on the metadata. Step 615 may be performed in the manner described with respect to FIGS. 3 and 4. For example, the video display device may plot the video files relative to one another against a global frame of reference. In a particular example, the global frame of reference may be a timeline and the video display device may plot the video files relative to one another based on video capture time. The video capture time of each plotted video file may be normalized (e.g., adjusted) based on the time settings of the video capture devices.

At step 620, the video display device determines any overlapping segments of the video files based on the metadata. Step 620 may performed in the manner described with respect to FIG. 4. For example, based on the plot of video files against the timeline, the video display device may determine whether there are overlapping video segments at any time along the timeline.

At step 625, the video display device forms a thumbnail image for each determined overlapping segment from step 620. For example, for each determined overlapping segment from step 620, the video display device may form a thumbnail image from a frame of the overlapping video segment.

At step 630, the video display device creates a single video file based on the video files arranged in the logical sequence. Step 630 may performed in the manner described with respect to FIG. 4. For example, the video display device creates a single video (e.g., video 90 of FIG. 4) based on the arrangement of video segments (e.g., C1, A2, A3, A4, B5, . . . ). Step 630 may include the video display device saving the single video as a video file in a hardware storage device.

At step 635, the video display device displays the single video file including any thumbnail images. Step 635 may performed in the manner described with respect to FIGS. 5*a-c*. For example, the video display device may display the video file (e.g., play the contents of video 90) on a video display (e.g., as shown in FIG. 5*a*). In embodiments, at times where there is an overlapping video segment, the video display device concurrently displays both the video and the thumbnail image associated with the overlapping video segment (e.g., as shown in FIG. 5*b*). In embodiments, at times where there are plural overlapping video segments, the video display device concurrently displays the video and plural thumbnail image associated with the plural overlapping video segments (e.g., as shown in FIG. 5*c*). In embodiments, at times where there no overlapping video segments, the video display device displays only the video (e.g., as shown in FIG. 5a).

At step 640, the video display device displays a video segment associated with a thumbnail image based on receiving a user-input selection of the thumbnail image. Step 640 may performed in the manner described with respect to FIGS. 5b-c. For example, a user may provide input to the video display device to select one of the displayed thumbnail images. Based on the user input, the video display device displays a video segment associated with the selected thumbnail image (e.g., plays the overlapping video segment on the visual display). After displaying the displays a video segment associated with the selected thumbnail image, the video display device may automatically return to displaying the single video file, e.g., beginning at a location of the video file that was last displayed before the displaying the video segment associated with the selected thumbnail image.

In embodiments, the invention provides a method that performs the process of the invention on a subscription, advertising, and/or fee basis. That is, a service provider, such as a Solution Integrator, could offer to provide merging video files from multiple sources functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for merging video files from multiple sources. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of merging video files into a consolidated video file, comprising:
receiving, by a computer device, a first video file from a first video capture device and a second video file from a second video capture device;
determining, by the computer device, an overlapping portion of the first video file and the second video file, the overlapping portion comprising a primary segment of the first video file and a secondary segment of the second video file;
creating, by the computer device, a thumbnail image comprising a still frame of the secondary segment;
creating, by the computer device, a single continuous video file from the first video file and the second video file by merging together segments of the first video file and the second video file using digital video editing, wherein the secondary segment is excluded from the single continuous video file;
simultaneously playing, by the computer device, video contents of the single continuous video file and displaying the thumbnail image on a display screen;
receiving, by the computer device, a user selection of the displayed thumbnail image;
temporarily interrupting, by the computer device, the playing of the video contents of the single continuous video file while playing video contents of the secondary segment in response to the user selection; and
automatically playing, by the computer device, the video contents of the single continuous video file after playing the video contents of the secondary segment.

2. The method of claim 1, further comprising:
receiving, by the computer device, a third video file, wherein the determining an overlapping portion of the first video file and the second video file further comprises determining an overlapping portion of the first video file, the second video file, and the third video file, the overlapping portion comprising the primary segment of the first video file, the secondary segment of the second video file, and a tertiary segment of a third video file;
creating, by the computer device, a second thumbnail image comprising a still frame of the tertiary segment, wherein the creating the single continuous video file comprises creating the single continuous video file from the first video file, the second video file and the third video file, and wherein the second segment and the tertiary segment are excluded from the single continuous video file, and wherein the simultaneously playing the video contents of the single continuous video file and displaying the thumbnail image on a display screen comprises simultaneously playing the video contents of the singe single continuous video file while displaying the thumbnail image and the second thumbnail image.

3. The method of claim 2, further comprising receiving metadata associated with each of the first video file, the second video file, and the third video file.

4. The method of claim 1, further comprising receiving metadata associated with each of the first video file and the second video file.

5. The method of claim 4, wherein the metadata includes at least one of: video capture date, video capture time, and video capture location.

6. The method of claim 4, wherein the metadata includes video capture time, and further comprising:
receiving a respective time setting from each of the first video capture device and the second video capture device; and
normalizing the video capture time of each of the first video file and the second video file based on the respective time settings of the first video capture device and the second video capture device.

7. The method of claim 1, further comprising registering each of the first video capture device and the second video capture device with the computer device.

8. The method of claim 1, wherein the simultaneously playing the video contents of the single continuous video file and displaying the thumbnail image comprises:
 playing the video contents of the single continuous video file while not displaying the secondary segment at times that do not correspond to the secondary segment;
 wherein the simultaneously playing video contents of the single continuous video file and displaying the thumbnail image comprises simultaneously playing the video contents of the single continuous video file and displaying the thumbnail image at times that correspond to the secondary segment.

9. The method of claim 1, wherein the creating the single continuous video file comprises arranging the segments of the first video file and the second video file in a sequence.

10. The method of claim 9, wherein the arranging the segments of the first video file and the second video file in the sequence is performed based on a determined continuity.

11. The method of claim 10, wherein the determined continuity is based on one of: video capture time; video capture location; and frame-by-frame analysis.

12. The method of claim 9, further comprising receiving metadata associated with each one of the first video file and the second video file, and wherein the arranging the segments of the first video file and the second video file in the sequence is performed based on the metadata.

13. The method of claim 1, wherein the computer device comprises a television and the playing the video contents of the single continuous video file comprises playing the contents of the single continuous video file on the television.

14. The method of claim 1, further comprising deploying a system for merging videos comprising providing the computer device operable to perform the steps of claim 1.

15. A computer program product for merging video files into a consolidated video file, the computer program product comprising a computer readable storage medium having program instructions embodied therewith, the program instructions being executable by a computer device to cause the computer device to:
 receive plural video files and metadata associated with each of the plural video files from plural video capture devices;
 arrange segments of the plural video files in a logical sequence based on the metadata;
 determine an overlapping portion of the plural video files comprising at least a primary segment of one of the plural video files and a secondary segment of another of the plural video files;
 create a single continuous video file from the arranged segments of the plural video files, wherein the secondary segment is excluded from the single continuous video file;
 play the single continuous video file;
 create a thumbnail image for the secondary segment;
 simultaneously display the thumbnail image while playing the single continuous video file, wherein the simultaneously displaying the thumbnail image while playing the single continuous video file occurs after the creating the single continuous video file and the creating the thumbnail image;
 receive a user selection of the displayed thumbnail image;
 temporarily interrupt the playing of video contents of the single continuous video file while playing video contents of the secondary segment in response to the user selection; and
 automatically play the video contents of the single continuous video file after playing the video contents of the secondary segment.

16. The computer program product of claim 15, wherein:
 the metadata comprises video capture time; and
 the logical sequence is a chronological sequence based on the video capture time.

17. The computer program product of claim 15, wherein the program instructions further cause the computer device to:
 determine that the overlapping portion of the plural video files comprises a tertiary segment of a third video file;
 create a second thumbnail image comprising a still frame of the tertiary segment, wherein the creating the single continuous video file comprises creating the single continuous video file from the arranged segments of the plural video files, wherein the second segment and the tertiary segment are excluded from the single continuous video file; and
 simultaneously display the second thumbnail image while playing the single continuous video file.

18. A system for merging video files into a consolidated video file, comprising:
 a CPU, a computer readable memory and a computer readable storage medium;
 program instructions to receive plural video files and metadata associated with each of the plural video files from plural video capture devices;
 program instructions to arrange segments of the plural video files in a logical sequence based on the metadata;
 program instructions to determine an overlapping portion of the plural video files comprising at least a primary segment of one of the plural video files and a secondary segment of another of the plural video files;
 program instructions to create a thumbnail image for the secondary segment;
 program instructions to create a single continuous video file by merging the arranged segments of the plural video files using digital video editing, wherein the secondary segment is excluded from the single continuous video file;
 program instructions to concurrently play video contents of the single continuous video file while displaying the thumbnail image after the creating the thumbnail image and the creating the single continuous video file;
 program instructions to receive a selection of the displayed thumbnail image;
 program instructions to temporarily interrupt the playing of the video contents of the single continuous video file while playing video contents of the secondary segment in response to the selection of the displayed thumbnail image; and
 program instructions to automatically play the video contents of the single continuous video file after playing the video contents of the secondary segment,
 wherein the program instructions are stored on the computer readable storage medium for execution by the CPU via the computer readable memory.

19. The system of claim 18, wherein:
 the metadata comprises video capture time; and
 the logical sequence is a chronological sequence based on the video capture time.

20. The system of claim 18, further comprising: program instructions to rank the plural video capture devices based on quality of the video files of the respective plural video capture devices.

* * * * *